(12) United States Patent
Hopmann et al.

(10) Patent No.: US 7,065,784 B2
(45) Date of Patent: Jun. 20, 2006

(54) SYSTEMS AND METHODS FOR INTEGRATING ACCESS CONTROL WITH A NAMESPACE

(75) Inventors: Alexander I. Hopmann, Seattle, WA (US); Van C. Van, Kirkland, WA (US); Brian J. Deen, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 195 days.

(21) Appl. No.: 10/779,221

(22) Filed: Feb. 13, 2004

(65) Prior Publication Data

US 2004/0162997 A1 Aug. 19, 2004

Related U.S. Application Data

(63) Continuation of application No. 09/360,530, filed on Jul. 26, 1999, now abandoned.

(51) Int. Cl.
*H04L 9/00* (2006.01)
(52) U.S. Cl. .................. 726/4; 726/1; 726/5; 726/7; 726/26; 726/27; 726/29; 713/154; 713/159; 713/170; 713/185; 709/203; 709/217; 709/218; 709/219; 709/226; 709/238
(58) Field of Classification Search ............... None
See application file for complete search history.

(56) References Cited

U.S. PATENT DOCUMENTS

| | | | | |
|---|---|---|---|---|
| 5,586,260 A | * | 12/1996 | Hu | 726/12 |
| 5,787,177 A | * | 7/1998 | Leppek | 713/164 |
| 5,796,393 A | * | 8/1998 | MacNaughton et al. | 715/733 |
| 5,918,228 A | * | 6/1999 | Rich et al. | 707/10 |
| 6,029,245 A | * | 2/2000 | Scanlan | 726/4 |
| 6,182,142 B1 | * | 1/2001 | Win et al. | 709/229 |
| 6,189,103 B1 | * | 2/2001 | Nevarez et al. | 726/5 |
| 6,279,111 B1 | * | 8/2001 | Jensenworth et al. | 726/10 |
| 6,341,312 B1 | * | 1/2002 | French et al. | 709/227 |
| 6,377,994 B1 | * | 4/2002 | Ault et al. | 709/229 |
| 6,442,564 B1 | * | 8/2002 | Frey et al. | 707/103 R |
| 2005/0149726 A1 | * | 7/2005 | Joshi et al. | 713/164 |

OTHER PUBLICATIONS

Gélinas,Jacques, "Virtual private servers and security contexts", maintained by (jack@solucorp.qc.ca), updated Oct. 5, 2004, entire document, www.solucorp.qc.ca/miscprj/s_context. hc?dp=0&full=1&prjstate=1&nodoc=0.*

* cited by examiner

*Primary Examiner*—Ayaz Sheikh
*Assistant Examiner*—Ronald Baum
(74) *Attorney, Agent, or Firm*—Workman Nydegger (57) ABSTRACT

Provided are methods and systems for integrating the access controls of computer resources into a namespace or domain. For a remote user, a computer network or system is a namespace represented by a URL. In order to enforce the access controls of the computer network being accesses, a remote user is impersonated by a server of the computer system such that access requests to the resources of a system are made by the server in the security context of the remote user. By impersonating the remote user, the actual rights of the remote user are being presented to the access controls rather than the rights of the server. In this manner, the access control of the system can be enforced directly on the remote user and the access control is effectively extended to the namespace.

20 Claims, 4 Drawing Sheets

SYSTEMS AND METHODS FOR INTEGRATING ACCESS CONTROL WITH A NAMESPACE

CROSS-REFERENCE TO RELATED APPLICATIONS

This application is a continuation application of U.S. Ser. No. 09/360,530, filed Jul. 26, 1999, now abandoned entitled "Systems and Methods for Integrating Access Control with a Namespace", which is incorporated herein by reference.

BACKGROUND OF THE INVENTION

1. The Field of the Invention

The present invention relates to controlling access to computer resources. More specifically, the present invention relates to integrating the access control of computer resources to namespaces beyond the namespaces of a file system.

2. Background and Relevant Art

An issue of substantial concern in computer networks is maintaining the integrity of its resources by preventing unauthorized access to those resources. A primary method of preventing unauthorized access to a resource or a computer network is to authenticate the identity of the potential user. Authentication is the process of ensuring that logins and messages from a user originate from an authorized source. More simply, authentication is the process of discovering the identity of the user. Frequently, this requires a potential user to supply the network or computer system with a user name and a user password. The user name and the user password are verified by the system, which may include comparing them with a security database containing authorized user names and corresponding passwords. If a user is authenticated, access to the system and its resources is granted.

Resources are still protected, however, even after a user has successfully logged on to the computer system. In many systems, all resources are assigned or associated with a security descriptor or are protected in some other manner. This applies not only to resources such as files, folders and directories, but also to threads, processes, events, and access tokens. The main feature of the security descriptor is to detail the security of the resource. This can be done by identifying which users have access to an object or resource and what those users can do with that resource. Read access and write access are two rights that are frequently listed in the security descriptor.

In some systems, the security descriptor is referred to as an access control list (ACL), which can be described as a small database. The access control list contains a plurality of access control entries (ACE) and each access control entry defines a particular right or group of rights. For instance, the first ACE associated to an object or resource may indicate that a particular user has read rights. The next ACE may detail the rights of a group of users to the resource associated with the ACL. When a user attempts to access a resource, the security system proceeds through the ACL to determine the access rights of the user. If the user is granted access to the object or resource, a handle is given to the process seeking access.

In a computer network, the security system is able to enforce the access controls or security descriptors related to access requests that specify a physical address of a resource. For example, when a user seeks access to "G:\web\" the security system can enforce the access control for at least two reasons. First, the user seeking access has been identified and authenticated when the user logged on to the computer network. Second, the user is seeking access to a known resource or object. The security system can analyze the access control to determine the rights of the user as to that resource.

The problem becomes more difficult when a remote user has logged on or accessed the system. The identity of the user is still authenticated, but the user does not reference the resource to be accessed using the notation of "drive:\folder\resource." Rather, the remote user employs a Uniform Resource Locator (URL) to access a particular resource. A URL represents a namespace or a domain, but must first be translated to the physical address of the resource. The translation is typically performed by a server which functions as an interface between the computer system, the resources of the computer system and the remote user.

Because the URL provided by the remote user is translated, the access control associated with the resource cannot be directly enforced by the computer system against the remote user. Instead, the server, which typically has rights and privileges to the system which are much greater than the typical remote user, accesses the resource and also enforces the access control by determining the rights of the remote user.

It would be an improvement in the art to apply access controls directly against remote users. In other words, there is a need to integrate access control into a URL namespace.

BRIEF SUMMARY OF THE INVENTION

The present invention provides for integrating the access control of system resources into a namespace or domain. From the point of view of a remote user, a computer network or system is a namespace or domain represented by a URL. The URL of the resource being accessed by the remote user is translated by a server of the system to provide the physical location of the resource. Each resource of a system is protected from unauthorized access by an access control or a security descriptor which is enforced against all users.

Enforcing access control against remote users is difficult because the resources desired by the remote user are accessed and transferred by a server. The server usually has access to more resources than the remote user and enforcing an access control against the server does not yield the same result always as would enforcing the access control against the remote user. To avoid this potential problem, a server usually evaluates the access control or other security mechanism to determine if the remote user has the necessary rights to use the resource.

The present invention provides for having the security system of the computer, rather than the server, enforce the access control of a resource against a remote user by having the server impersonate the remote user. When a remote user logs on to a system, a user name and password are provided. This information is verified by the server and if the user name and password provided are accurate, the remote user is authenticated and granted access to the system.

When a remote user logs on, a security ID is returned. The methods of the present invention then use the operating system, in one embodiment, to change the security context of the process executing the requests of the remote user. The security context of the authenticated user is used by the server to access resources which enables the security system of the operating system to enforce its access controls directly against the security context of the remote user. In effect, the server no longer has a need to both access the resource and check the access controls.

Thus the server impersonates the authenticated remote user for calls into the system resources. Once a remote user has been successfully impersonated, the server still makes the access requests to the system, but the access requests are under the context of the remote user. In this manner, the access control of a system has been integrated with a namespace.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Integrating the access control of a computer system into a namespace is difficult because a remote user accesses a systems resources through an intermediary. The intermediary is typically a server which has substantially more rights to the resources of a system than does a typical remote user. If the server does not take additional steps to ensure that the remote user has access to the specified resource, an unauthorized access could occur because the security context of a server permits it to have almost complete access to all resources.

Access control is the mechanism employed by a computer system to protect its resources. Access control is the second protective device encountered by most remote users as they are first required to log on to the computer system. Logging on requires a remote user to provide a user name and a user password which are verified. Access control, which is a form of authorization, provides additional protection to system resources and offers more variety and capability than authentication, which serves primarily to identify the user. For instance, access controls can be used to specify exactly what capabilities remote users have with regard to specific resources.

The methods and systems of the present invention relieve the server from enforcing the access controls of a computer system by impersonating the remote user. In other words, the security context of the remote user is identified and assigned to the process or thread that executes the requests of the remote user in one embodiment. Access to the system resources is still being made by the server, but the security context is that of the remote user. In this manner, the access control is enforced directly against the remote user and the access control is integrated into a namespace or a domain.

The present invention is described in terms of diagrams and flow charts. Using the diagrams and flow charts in this manner to present the invention should not be construed as limiting its scope. The embodiments of the present invention may comprise a special purpose or general purpose computer comprising various computer hardware.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired executable instructions or data structures and which can be accessed by a general purpose or special purpose computer. When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Figure 1:
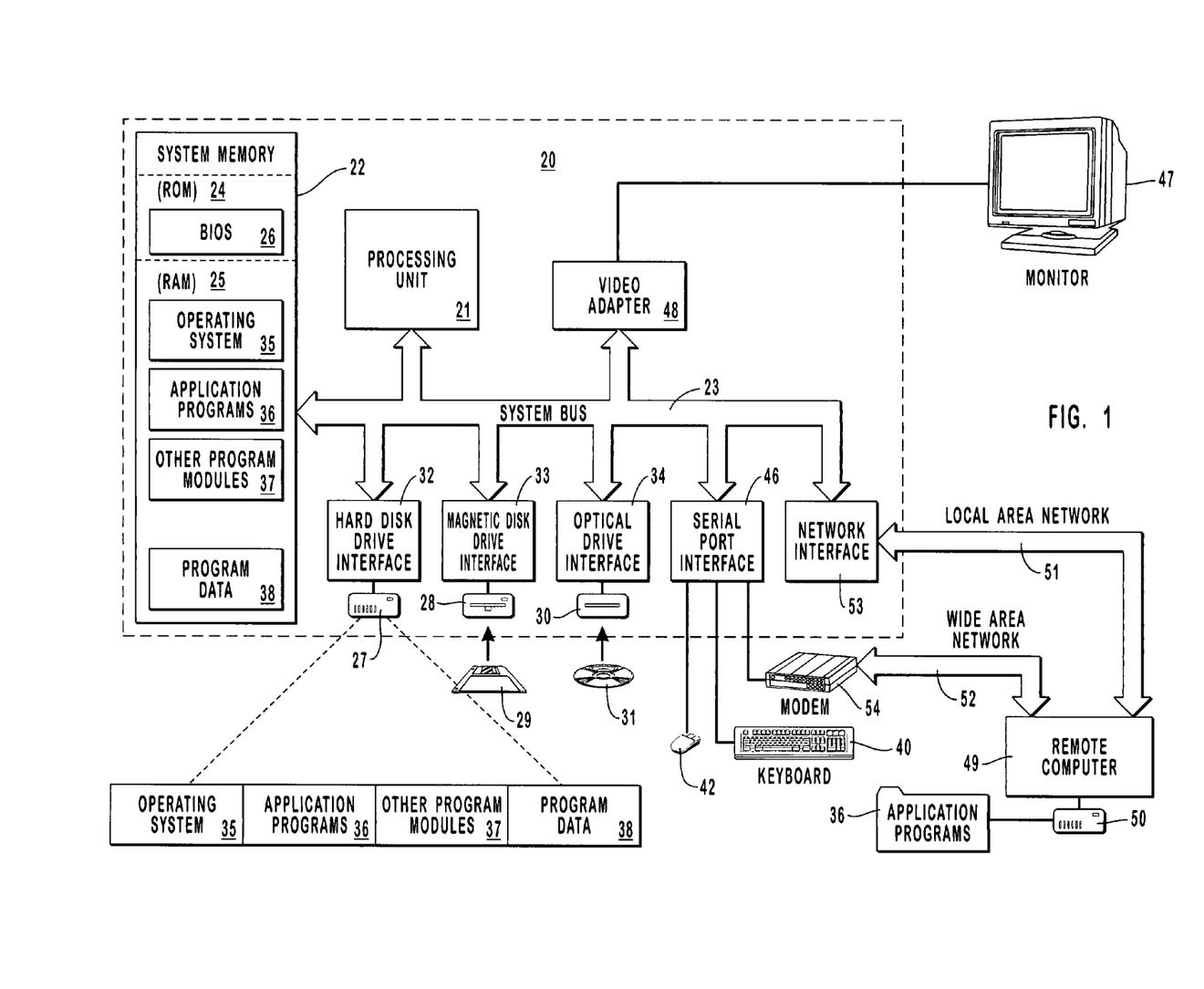
FIG. 1 is an exemplary system for implementing the methods of the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk 27, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

As used herein, a resource refers to computer readable media, programs, processes, threads, applications, memory, printing devices, networks, network connections, files, folders, directories, input/output devices, ports, documents, spreadsheets, operating systems, and more. In other embodiments, resource may refer only to data or files stored on computer readable media. More generally, however, a resource is an object, device or entity that can either receive or send data. As used herein, a file system is a system that an operating system uses to manage the available resources. In other instances an operating system and a file system are synonymous.

Figure 2:
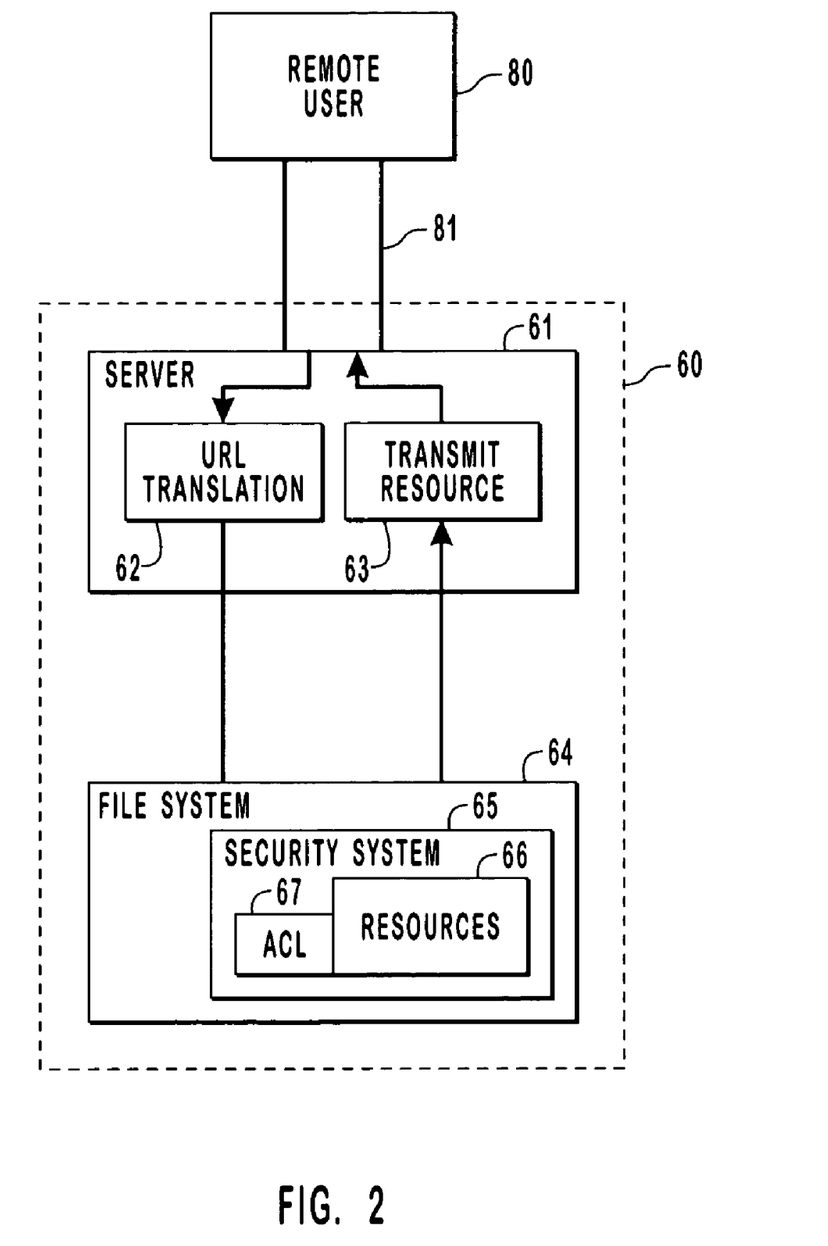
FIG. 2 is a block diagram of a remote user connected to a computer system through a server.

The remaining Figures are designed to illustrate exemplary systems and methods for integrating access controls to a namespace. FIG. 2 illustrates a remote user 80 having access to a computer system 60. System 60 can be a single computer or a computer network or any other computer system that is capable of being remotely accessed via connection 81, which may be an internet connection. From the point of view of remote user 80, system 60 represents a namespace or a domain and remote user 80 accesses system 60 and resources 66 of system 60 using a uniform resource locator (URL).

When remote user 80 seeks access to a particular resource, the URL is translated at server 61 to correspond to a physical location of the resource in file system 64. For example, a URL of "http://foo.bar.com/resource" may be translated or mapped "G:\web\resource." Resources 66 are typically protected by a security system 65. If access to resource 66 is granted to remote user 80, then the resource 66 is transmitted to remote user 80 by transmit resource module 63 of server 61.

As illustrated in FIG. 2, system 60, and more specifically, file system 64 has a mechanism in place to secure or protect resources 66 from unauthorized use or access. Security system 65 functions, in one embodiment, by associating an access control 67 with each resource 66. Access control 67 refers to the policies and mechanisms for controlling access to resources 66. In one embodiment, access control 67 is an access control list which specifies the operations that a particular user can perform on the resource or object being protected. For instance, an access control list may permit a user to read the resource but not write to the resource. Access control 67 may enforce security on a potentially large number of users and the rights of each user are usually detailed in access control 67.

In one embodiment, access control 67 is a small database containing entries which specify the right of particular users. Each database, in this embodiment, comprises access control entries which specify a particular right or group of rights. The first entry may specify that the user A has read access and the second entry may specify the rights of a group of users. When an access to resource 66 occurs, the access control entries, in this embodiment, are examined until the appropriate entry is found which specifies the rights of the user seeking access. Thus, if user B is attempting to write to the resource, the access control entries are evaluated until the entry corresponding to the write privilege or right of user B is found. Depending of the access control entry, the write attempt of user B is either granted or denied.

When remote users have the capability to access the system, the security of the resources becomes a greater issue. When remote user 80 logs on to system 60, the identity of remote user 80 is authenticated. For remote user 80, access to resources 66 of system 60 is currently made by server 61. For each access request by remote user 80, server 61 accesses security system 65 to determine if remote user 80 has the right to access the resource as desired. Server 61 typically has many more rights and privileges than remote user 80 and has the capability to perform this task.

A system that is remotely accessed, like a web site however, can potentially be accessed by millions of different users. Requiring server 61 to verify the access rights of millions of remote users not only requires a significant amount of processing time, but also creates a potential problem because, as described earlier, server 61 has more rights to resources 66 than the typical remote user 80. A preferred solution is to utilize the security system already present on system 60, rather than requiring server 61 to analyze the rights and privileges of each remote user 80 as well as enforce the security of system 60 on remote user 80.

Figure 3:
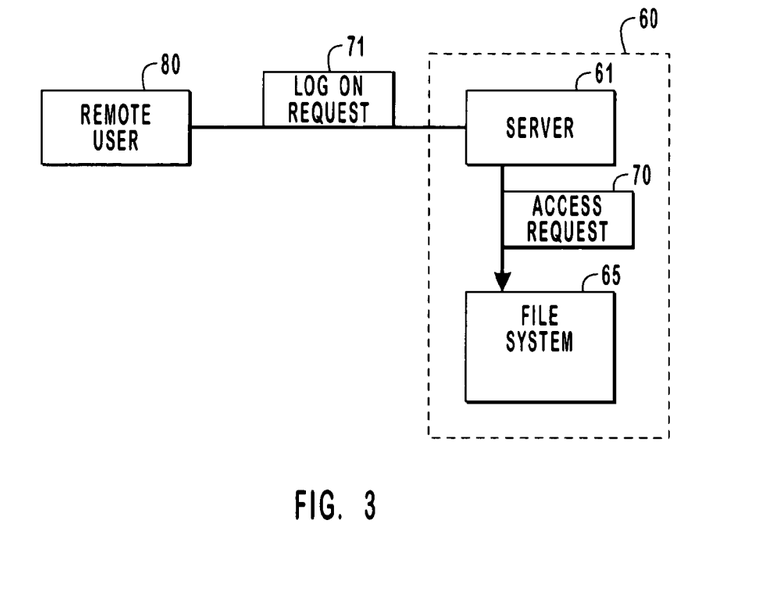
FIG. 3 is a block diagram illustrating a log on request to the system and an access request to the file system of a computer.

Before access control 67 is enforced against a remote user, the remote user must log on to system 60 and FIG. 3 serves to illustrate the log on process of remote user 80. Log on request 71 is sent by remote user 80 and received by system 60 at server 61. Typically, remote user 80 is required to supply a user name and a user password to server 61. The user name and password are authenticated by determining if the user name and password are present in a security database on system 60. If the user name and password are verified or authenticated, then remote user 80 has successfully logged on to system 60. Once remote user 80 has successfully logged on to system 60, access request 70 for a particular resource is still made to file system 65 by server 61.

Figure 4:
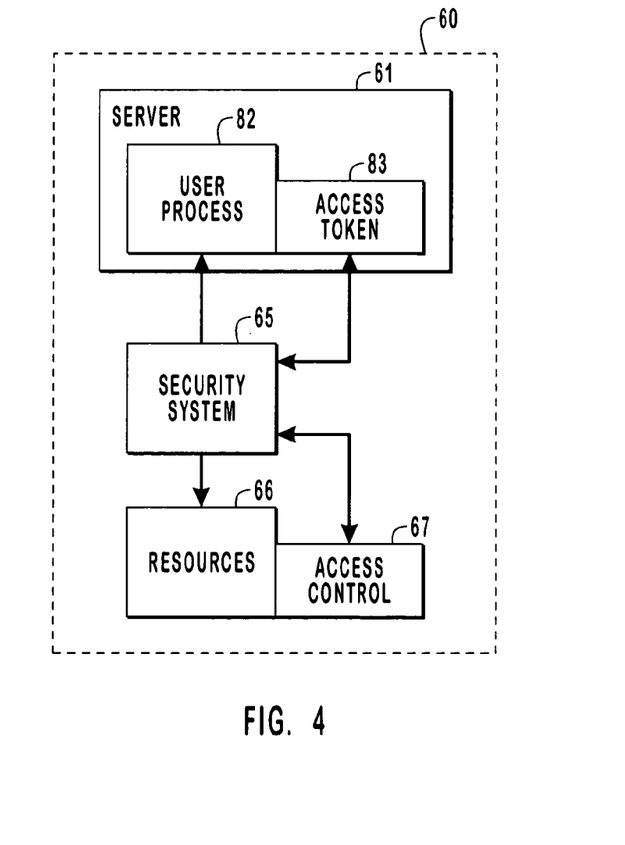
FIG. 4 is a block diagram depicting a server accessing a resource in the context of a remote user.

The authentication of the user name and password involves more than determining if the user name and password supplied by remote user 80 match a user name and password in a security database on system 60. FIG. 4 more fully illustrates the log on process and illustrates how security system 65 of system 60 is used to monitor and control accesses to resources rather than requiring server 61 to determine the rights and resource privileges of each remote user. Upon logging on to system 60, user process 82 is created and access token 83 is associated with user process 82.

Access token 83 comprises a security context, which in some embodiments is a security ID (SID). Because user process 82 is maintained by server 61, any request to resources 66 of system 60 uses the security context of server 61. Under the methods of the present invention, server 61 impersonates remote user 80 by changing the security context under which access to resources 66 is made. This relieves server 61 from having to request the resource and enforce the access control of the resource by checking or evaluating the security associated with the resource. By impersonating remote user 80, security system 65 enforces access control 67 against server 61 directly.

Access control 67 is already present in system 60. For a namespace, which can be accessed millions of times per day, integrating access control 67 to the namespace is an optimal solution. Even though the connection is anonymous and a user name and password are not usually supplied, there is still a default identity in system 60 which is used for anonymous remote users. In this manner, anonymous users as well as known users are authenticated. Access control 67 has already been created by system 60 and contains and defines the rights and privileges of anonymous remote users as well as the rights and privileges of known users. In this manner, access control 67 is integrated with a namespace or domain.

When an access request to resources 66 is made, security 65 is capable of enforcing access control regardless of whether the process making the request is from a remote or local user. In the case of a remote user, access token 83 is evaluated by security system 65 and compared with access control 67. The SID provided in access token 83 belongs to the remote user because server 61 is impersonating the remote user. Thus security system 65 simply enforces access control 67 against user process 82 as if it were the remote user that was attempting to access resources 66.

Figure 5:
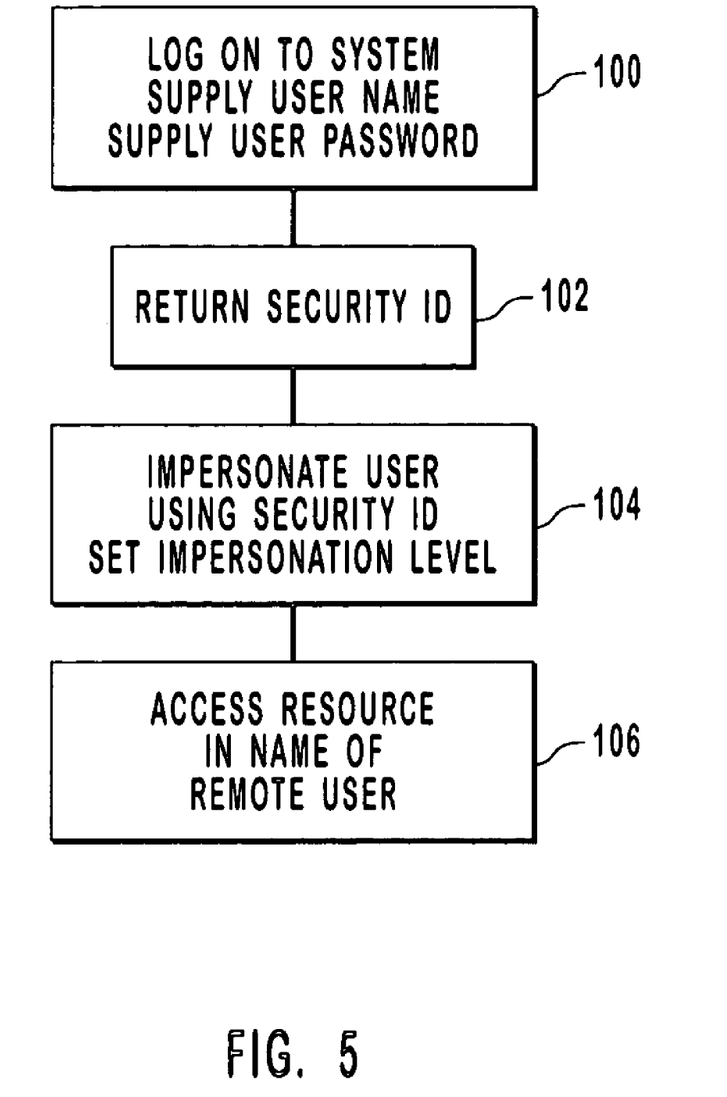
FIG. 5 is a flow chart of an exemplary method for having a server impersonate a remote user for resource access.

FIG. 5 is a flowchart illustrating one embodiment of a method for enforcing access controls on remote users. In step 100, a remote user logs on to a system by, as previously described, supplying the system with a user name and a user password. After the remote user is authenticated in step 100, the server receives the security ID or access token of the remote user in step 102. In step 102, one or more processes are created which are responsible for executing the requests of the remote user. Even though the access token may contain the security context of the remote user, any access to the system resources is done under the security context of the server. Thus, the operating system is utilized to change the security context of the server's access requests to match the security context of the remote user. Those processes responsible for executing requests of the remote user are now running under the security context of the remote user. Changing the security context allows the server to access the resources of a system as if it were the remote user. In other words, access to the resources of a system are made by the server impersonating the remote user in step 104.

In addition to changing the security level or context at the server, the server can impersonate the remote user at a number of different levels. The impersonation levels correspond essentially to different types of commissions or represent how the server can impersonate the remote user. For instance, the server can completely impersonate the remote user for all requests, or the impersonation can be for a particular network, or the impersonation can be limited to a single access. The level and type of impersonation can be altered and may depend on the task being performed.

In step 106, the resource is accessed by the server having the security context of the remote user and the access control of the computer system regulates and controls access to the resource against the remote user directly. Because the server is physically making the access to the resource in the context of the remote user, it is not necessary to contemplate creating access control to the URL or the namespace because the underlying security or access control of the computer system can be utilized against a remote user through impersonation. In this manner, access control is integrated to the namespace in this embodiment.

The present invention may be embodied in other specific forms without departing from its spirit or essential characteristics. The described embodiments are to be considered in

What is claimed and desired to be secured by United States Letters Patent is:

1. In a computer system comprising a server that provides remote access to one or more resources and a security system for controlling access to the one or more resources, a method for enforcing access control to a resource of a computer system at the security system as opposed to enforcing access control at the server, the method comprising the steps of:

the server processing a logon request from a remote user;
the server producing a security context of the remote user based on the logon request;
assigning the security context of the remote user to the server, wherein assigning the security context of the remote user to the server includes changing a previous security context of the server and by replacing the previous security context of the server with the security context of the remote user; and
the server accessing the resource on behalf of the remote user with the assigned security context of the remote user, which replaced the previous security context of the server, so that the security system can enforce access control against the remote security context, thereby relieving the server from enforcing access control against the remote user if the server instead were to access the resource with the server's security context.

2. A method as defined in claim 1, wherein the step of processing a logon request further comprises the step of receiving a user name and a user password from the remote user.

3. A method as defined in claim 1, wherein the step of processing a logon request further comprises the step of authenticating the identity of the remote user.

4. A method as defined in claim 1, wherein the step of assigning to the server the security context of the remote user further comprises the step of receiving the security context of the remote user from the system.

5. A method as defined in claim 1, wherein the security context of the remote user is stored by the system.

6. A method as defined in claim 1, wherein the step of accessing the resource further comprises evaluating the security context of the remote user that is assigned to the server with the security system.

7. A method as defined in claim 1, further comprising a step of the security system enforcing the access control by determining rights of the server to the resource based on the security context of the remote user.

8. A method as defined in claim 1, wherein the security context is a security ID.

9. In a computer system comprising a server that provides remote access to one or more resources and a security system for controlling access to the one or more resources, a method of enforcing access control, by the security system, on a remote user accessing a resource, as opposed to enforcing access control at the server, the method comprising the steps of:

the server receiving from the remote user a request to access the resource;
the server authenticating the identity of the remote user to produce a remote security context for the remote user;
the server creating a process for executing the access request of the remote user, wherein the process initially has a security context of the server;
changing the security context of the process to match the remote security context of the remote user;
the server using the process with the remote security context to access the resource on behalf of the remote user; and
the security system enforcing access control on the remote security context thereby relieving the server from having to enforce access control against the remote user, had the server instead accessed the resource with the server's security context.

10. A method as defined in claim 9, wherein the remote security context comprises a security ID of the remote user.

11. A method as defined in claim 9, wherein the step of changing the security context of the process further comprises the step of assigning a level of impersonation.

12. A method as defined in claim 11, wherein the level of impersonation indicates the use of the remote security context by the server.

13. A method as defined in claim 9, wherein the step of enforcing access control further comprises the steps of evaluating, by the security system, rights to the resource which are granted by the remote security context.

14. A method as defined in claim 9, wherein the step of enforcing access control further comprises the step of restricting access to the resources by the server to rights of the remote user.

15. In a computer system comprising a server that provides remote access to one or more resources and a security system for controlling access to the one or more resources, a computer program product for a method of enforcing access controls at the security system against remote users as opposed to enforcing access controls against remote users at the server, the computer program product comprising:

a computer-readable medium carrying computer-executable instructions for implementing the method wherein the computer-executable instructions comprise:
program code means for receiving from a remote user a request to access a resource;
program code means for authenticating the identity of the remote user at the server to produce a remote security context of the remote user;
program code means for altering and replacing a previous security context of the server to match the remote security context for the remote user to allow the server to perform the access request on behalf of the remote user with the remote security context of the remote user; and
program code means for accessing the resource with the server using the remote security context of the remote user, which was used to alter and replace the previous security context, so tat the security system can enforce access control against the remote security context in order to relieve the server from enforcing access control against the remote user if the server instead had accessed the resource with the server's security context.

16. A computer program product as in claim 15, wherein the computer executable instructions further comprise program code means for evaluating rights of the remote user granted by the access controls.

17. In a computer system comprising a server that provides remote access to one or more resources and a security system for controlling access to the one or more resources, a computer program product for a method of enforcing access controls on a remote user of the computer system at the server system as opposed to enforcing access control against the remote user at the server, the computer program product comprising:

a computer readable medium carrying computer-executable instructions for implementing the method wherein the computer executable instructions comprise:

program code means for authenticating the identity of the remote user at a server;

program code means for producing a remote security context for the remote user;

program code means for changing a security context of the server to match the remote security context of the remote user for access requests of the remote user executed by the server; and program code means for executing access requests from the server with the remote security context of the remote user so that the security system enforces access control against the remote security context, thereby relieving the server from enforcing access control against the remote user if the server instead had accessed the resource with a security context of the server.

18. A computer program product as in claim 17, wherein the computer executable instructions further comprise program code means for assigning a level of impersonation indicating the scope of use of the remote security context by the server.

19. A computer program product as in claim 17, wherein the computer executable instructions further comprise program code means for evaluating, by the security system, the remote security context assigned to the server.

20. A method as recited in claim 1, wherein the method further includes the server impersonating the remote user at different security levels, and by changing a security context assigned to the server to various different security contexts, based on different tasks.

* * * * *